Nov. 9, 1926.
E. C. CLARKE
1,606,559
ELECTRICALLY GOVERNED CLUTCH
Filed Dec. 2, 1921   3 Sheets-Sheet 2
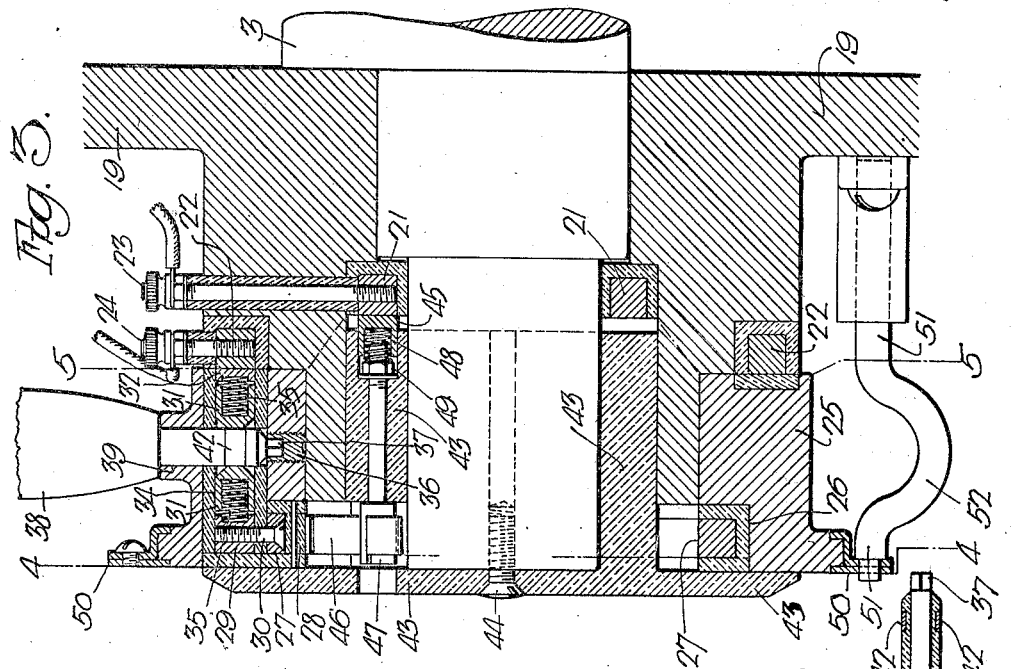
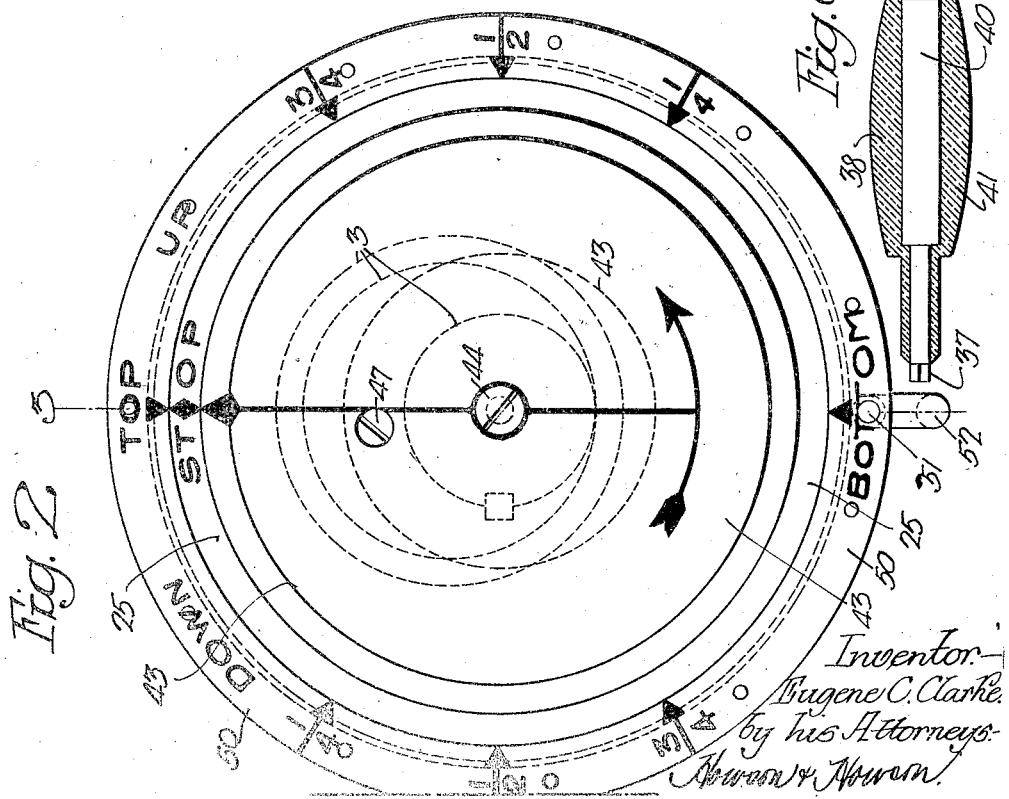

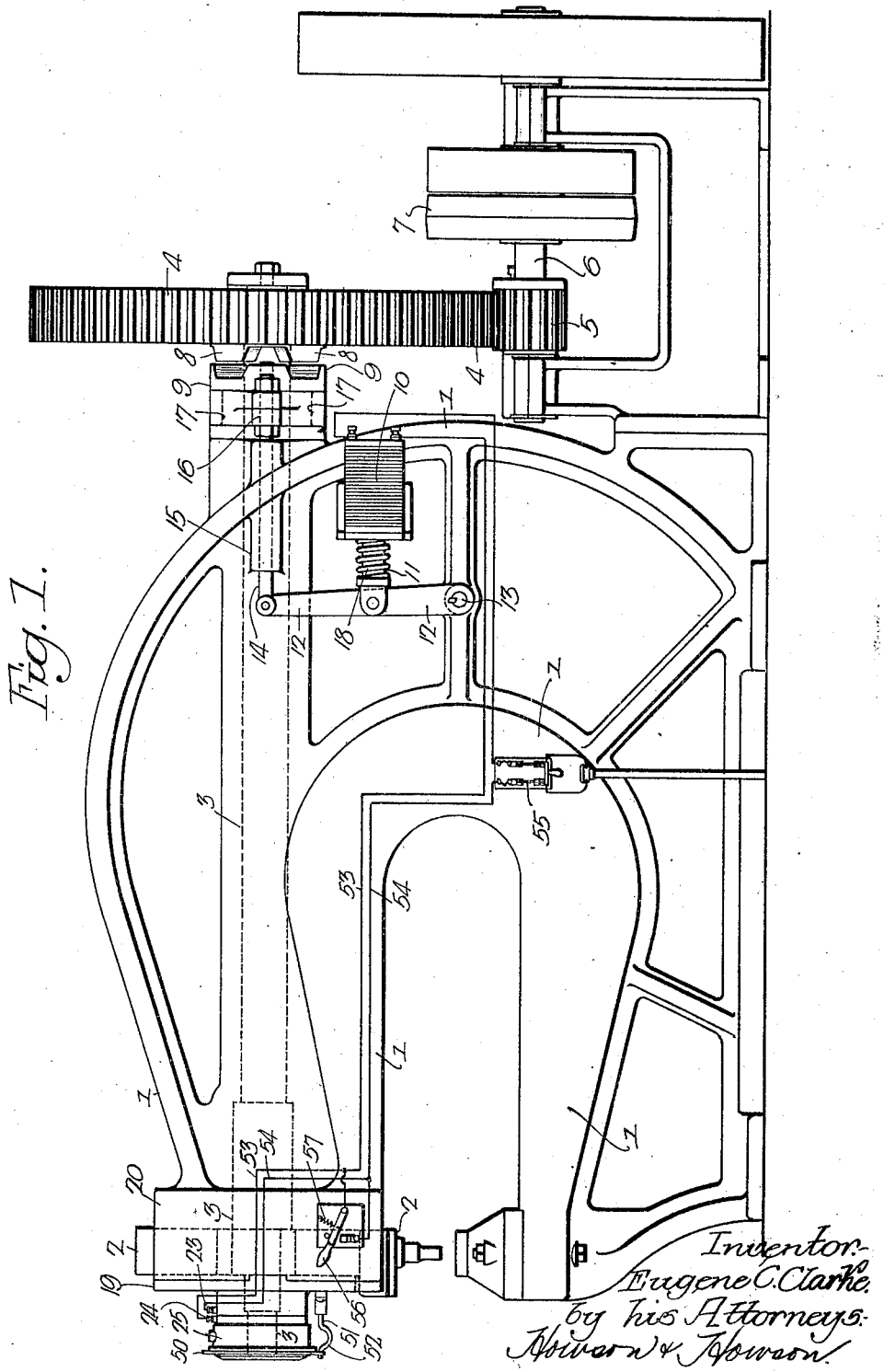

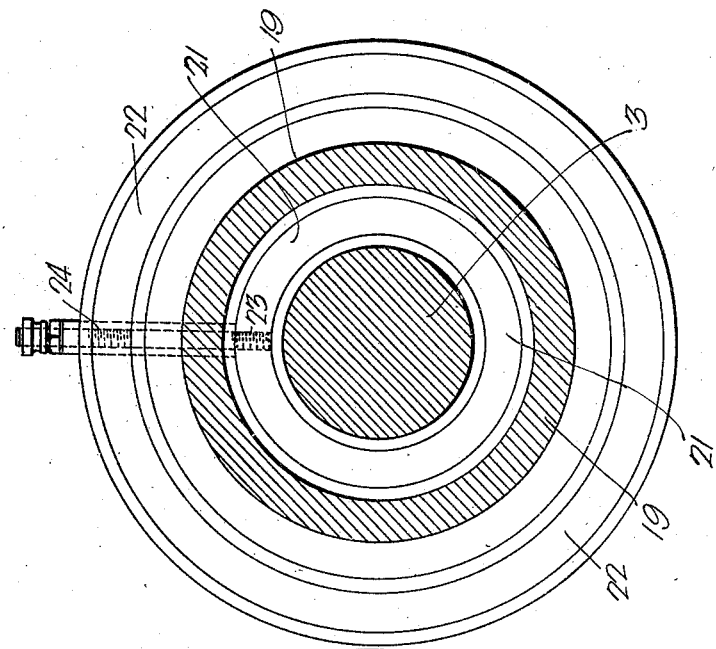
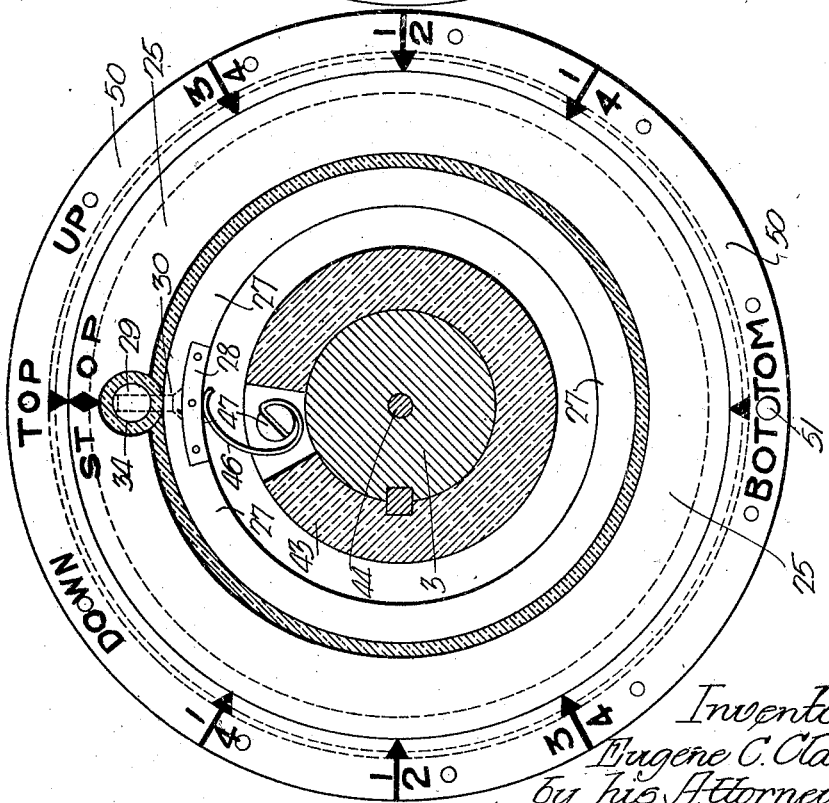

Patented Nov. 9, 1926.

1,606,559

UNITED STATES PATENT OFFICE.

EUGENE C. CLARKE, OF CHAMBERSBURG, PENNSYLVANIA, ASSIGNOR TO CHAMBERSBURG ENGINEERING COMPANY, OF CHAMBERSBURG, PENNSYLVANIA, A CORPORATION OF PENNSYLVANIA.

ELECTRICALLY-GOVERNED CLUTCH.

Application filed December 2, 1921. Serial No. 519,552.

My invention relates to improvements in control mechanism for clutches, and more particularly in clutch controls adapted for use in connection with machines such as punches, shears, and presses that require a cessation of operations after each stroke. It has been the custom in the past to actuate such machines through clutches controlled by mechanical movement with a pedal, lever, spring, solenoid or other element as a prime mover, and engagement or disengagement of the clutch has been, prior to my invention, almost universally effected by the use of cams and rollers.

In machines employing clutches having control mechanism of this type, adjustment of the cam is necessary to vary the point in the stroke at which it is desired to stop the machine, and such adjustment requires a shutting down of the power and expenditure of considerable time and labor for accurate work, due partly to the fact that the cams as a rule are removed from the working end of the machine.

The main object of this invention is to eliminate the use of cams and their entailing expense in manufacture and adjustment, and to provide means for rapid, accurate setting of the point of termination of each stroke, a further object being to provide means for continuous operation of the machine without the requirement of changes or adjustments in the mechanism.

The mechanism by which these and other ends appearing hereinafter are achieved is illustrated in the attached drawings, in which:

Figure 1 is a side elevation of a punch equipped with clutch controlling mechanism made in accordance with my invention;

Fig. 2 is a front view of a portion of the head of the machine illustrating details of the setting device;

Fig. 3 is a section on the line 3—3, Fig. 2;

Figs. 4 and 5 are sections on the lines 4—4 and 5—5, respectively, Fig. 3, and

Fig. 6 is a transverse section of the setting plug.

With reference to the drawings, 1 represents the frame of a punching machine of well known form in which is mounted a movable punching head 2 reciprocated in the frame in usual manner by means of a rotating eccentric shaft 3 mounted in the said frame. The shaft 3 receives its rotation, in the present instance, through a gear wheel 4 mounted on the shaft which meshes with a pinion 5 upon a shaft 6, the latter being operatively connected through a pulley 7 with any suitable external source of power (not shown). The gear wheel 4 is loosely mounted upon the shaft 3, and has associated therewith the fixed element 8 of a clutch, said clutch comprising also an element 9 splined to the shaft 3 and movable axially thereon into and out of engagement with the fixed element 8. When the elements of the clutch are engaged, the shaft 3 is rotated with the gear 4, and when disengaged, the gear 4 rotates idly upon the shaft.

As previously stated, in machines of this type, it is customary to provide mechanical means controlling the operation of the clutch, said means usually comprising cams and rollers located at the rear of the machine upon the shaft 3 and adjacent the clutch element 9. This control is such that after each engagement of the clutch elements effecting a movement of the punching head, the clutch is automatically disengaged after one complete revolution of the shaft or one stroke of the head.

It will be apparent that in adjusting the cams to obtain a stopping of the machine at any given point in the stroke, the operator must leave the front end of the machine and accordingly is in no position to observe the setting in its effect upon the punching head. With control mechanism of this type, it is difficult to get an accurate setting except with an expenditure of considerable time.

I employ a motor adapted to control both engagement and disengagement of the clutch and a controller operatively associated with the driven member or shaft and with the motor for controlling the operation of the latter. Electricity, water, compressed air or other fluid may be employed as the actuating medium for the motor, but I prefer to use electricity, and the mechanism herein described and illustrated in the drawings is adapted to the use of this medium. Thus the motor in the present instance takes the form of a solenoid and plunger associated therewith, the controller being in the form of an interrupter or circuit breaker associated with the shaft or driven member.

It will be noted hereinafter that in the present instance the solenoid does not provide the reciprocating motion required for full operation of the clutch and that a spring functions as prime mover of the clutch in disengaging the latter. Since this spring, however, is entirely under control of the solenoid, operating only by reason of the deenergization of the latter, it may be considered as a part proper of the said motor. Furthermore, it has been found entirely practicable to so form the jaws of the clutch that there will exist a tendency for the clutch elements to separate in operation, this tendency normally being overcome by the action of the solenoid which holds the elements in engagement, but being sufficient to effect disengagement of the elements when the solenoid is deenergized. This effect may be obtained by tapering the interlocking jaws of the clutch as shown in Fig. 1, and it will be apparent that where the full desired effect is obtained in this manner, the aforementioned spring may be eliminated. It has also been found desirable to utilize this effect, at least in part, to assist the spring in disengaging the clutch, whose elements in the present instance are shown so formed for this purpose.

A switch is provided for attaining the initial energization of the solenoid, the action of which latter effects engagement of the clutch, said switch after contact sufficient to accomplish energization being releasable and the solenoid then passing under the control of the circuit breaker. The circuit breaker is so arranged that after the completion of one stroke of the machine, the solenoid is automatically deenergized, thereby permitting the spring associated with the plunger to retract the latter and thereby effect disengagement of the clutch. Means is also provided for so setting the elements of the circuit breaker as to determine the exact point in the stroke at which the machine is to be stopped, said setting being accomplished either with the machine inactive or with the power still applied.

With reference to Fig. 1 of the drawings, 10 represents the solenoid having associated therewith in usual manner a plunger 11, which latter is secured to an oscillating lever 12 mounted on a rock shaft 13 carried in suitable bearings in the frame 1. The lever 12 has secured to its upper end a rod 14, which rod is mounted in a suitable guide 15 on the frame and has attached to its outer end a collar 16 which occupies an annular groove 17 in the clutch element 9. A spring 18 is mounted on the solenoid plunger 11 in such manner as to tend to retain this plunger in a retracted position maintaining disengagement of the clutch, the solenoid in advancing the plunger 11 to engage the clutch operating against the pressure of this spring 18. It is preferable that the shaft 13 extend through to the opposite side of the machine from that shown in Fig. 1, and that a duplicate set of mechanism to that just described be located upon the opposite side with a second rod 14 (not shown) also secured to the collar 16 at the opposite side of the element 9, thereby balancing the forces applied to the latter element.

The circuit breaking device is illustrated in Figs. 2 to 6, inclusive. With reference to Fig. 3, 19 designates that portion of the machine known as the cap, which cap is secured to the forward face of the fixed head 20 of the machine, in which is mounted the reciprocating head 2, the cap 19 functioning, among other things, to provide a bearing for the forward end of the shaft 3. Suitably mounted in the cap 19 and properly insulated therefrom are collector rings 21 and 22, said rings having extending therefrom, and in the present instance upwardly through the said cap, binding posts 23 and 24 respectively, which posts also are insulated from the cap.

Adjustably mounted on the outer end of the cap 19 is a ring 25, said ring having established in a lateral recess 26 therein and properly insulated from the ring 25, a collector ring 27 having at one side an insert 28 of insulating material. The ring 27 is normally electrically connected with the collector ring 22 by means of a conductor element 29 connected with the said ring 27 by a screw 30, a pair of spring pressed elements 31, 31, and a contact element 32, said elements 29, 31 and 32 being established in a lateral recess or passage 34 in the ring 25.

As clearly shown in Fig. 3, springs 35, 35, are confined between the element 29, the element 32 and the respective elements 31, 31, said springs tending to bring the latter two elements together, thereby to complete the circuit between the ring 27 and the ring 22, the element 32 being also forced by the spring 35 with which it is associated against the exposed face of the ring 22.

The ring 25 is normally secured in fixed position upon the cap 19 by means of a set screw 36, which screw has in the present instance in the outer end thereof an angular recess for the reception of a correspondingly formed end 37 of a plug wrench 38. It will be noted by reference to Fig. 3, that the said screw 36 is so located that access thereto for releasing or tightening can be gained only after separation of the elements 31, there being provided in the ring 25 an opening for the plug wrench 38, which opening passes directly through the recess 34 in which said elements 31 are established. The contacting ends of the elements 31 are beveled, as clearly shown in Fig. 3, to permit their separation by the plug wrench when the latter is inserted into the ring opening.

As clearly shown in Figs. 3 and 6, the plug wrench 38 comprises a metal or other body portion 40 which is entirely surrounded except for the portions 37, 37, at the ends with insulating material 41, said insulating portion near one end of the plug having inserted therein a ring conductor 42 so positioned that when that end of the plug is inserted into the opening 39 to cause the portion 37 to enter the set screw 36, this conductor ring 42 is engaged by the separated ends of the elements 31, 31, thereby maintaining the connection between the ring 27 and the ring 22.

Extending into an annular recess in the cap 19, in which recess is established the outer end of the shaft 3, is a revolving member 43, said member being formed of insulating material and being secured by means in the present instance of a screw 44 to the end of the shaft 3. The member 43 is adapted to rotate with the shaft and carries, in addition to a contact element 45 established in a recess on the inner side thereof and adapted to contact with the exposed face of the ring 21, a brush element 46, which latter is adapted to bear against the inner face of the ring 27, and which is electrically connected by means in the present instance of a bolt 47 with the said contact element 45. As shown in Fig. 3, the contact element 45 is pressed outwardly of the member 43 by means of a spring 48 confined between the rear of the contact member 45 and the outer face of a nut 49 upon the bolt 47.

It will further be noted that a ring 50 is mounted on the periphery of the ring 25, said ring being fixed to the cap 19 by means of a brace rod 51, which latter is adjustable and has an offset portion 52 for a purpose to be described hereinafter. The ring 50 is so mounted upon the ring 25 as to interfere in no way with the free movement of the latter ring upon the cap. The front face of the ring 50 and of the ring 25 and the revolving member 43 are marked as shown in Fig. 2, the markings upon the ring 50 designating points of the stroke at which it may be desired to stop the machine, the marking upon the ring 25 designating the position of the insulator element 28 of the ring 27, and the marking upon the face of the member 43 indicating the position of the brush 46. By loosening the set screw 36 and turning the ring 25 by means of the plug wrench 38 to bring the marking thereon into agreement with one or other of the markings on the ring 50, it is possible as indicated to effect stopping of the machine after each stroke at any point of the stroke, and either on the upward movement of the movable head or the downward movement, depending on which side of the vertical position the marking of the ring 25 is placed. If it is desired to stop the machine at the extreme bottom of the stroke, it is necessary to shift the ring 25 to bring the stop mark into registration with the marking designated "bottom" on the ring 50, and to provide for this movement of the ring 25 by the plug 38, the offset portion 52 is provided upon the adjustable stop 51, this offset portion swinging either to the left or right and permitting movement of the plug 38 into a position bringing the desired markings into registration.

It is, of course, apparent that the positions of the ring 25 are not confined to those indicated on the ring 50, but the "stop" marking upon the ring 25 may be placed at any desired position intermediate the markings on the ring 50 to obtain a stopping of the machine at any point in the stroke desired.

As best shown in Fig. 1, the binding posts 23 and 24 are electrically connected by means of wires 53—54, with the terminals of the solenoid 10, the wire 54 being connected through a switch 55 with a suitable source of electrical power not shown. The switch 55 during the periods when the machine is in use remains closed. There is also provided at the front of the machine a switch 56 so connected across the line 53—54 as, when closed, to make the circuit and effect the energization of the solenoid. The blade of the spring 56 preferably has attached thereto a spring 57 tending to retain the blade in an open position.

The operation of the device is as follows:

Having set the control elements to bring the machine to a stop at the desired point in the stroke, the operator closes the switch 56, this having the effect of energizing the solenoid or solenoids 10 and engaging the clutch 8—9. The initial movement of the shaft 3 carries the brush 46 clear of the insulating element 28 and onto the conducting surface of the ring 27, this having the effect of maintaining the circuit through the solenoid after the operator has released the switch 56. The energized solenoid maintains the engagement of the clutch, and the machine operates until the brush 46 again comes into contact with the insulating element 28, this happening at the completion of a full revolution of the shaft 3, or after one complete stroke of the movable head 2. Contact of the brush 46 with the insulating element 28 has the effect of deenergizing the solenoid 10, whereupon the spring 18 operates to shift the plunger 11 to a retracted position and to shift the rod 14 forwardly, carrying with it the element 9 of the clutch and disengaging the latter. Disengagement of the clutch immediately effects the stopping of the machine.

By retaining the switch 56 closed, continuous and uninterrupted operation of the machine is obtained.

If it is desired to alter the point in the stroke at which the machine stops, the operator may insert either end of the plug wrench 38, depending on whether he wishes the machine to continue its operation during the re-setting process or desires to have the machine at rest. Having inserted the wrench 38 and with it released the set screw 36, the ring 25 is swung into the position to give the desired stopping point and the set screw again secured.

It will be apparent that by inserting that end of the wrench 38 which carries the contact element 42, the operator is enabled to adjust the stopping position during the actual operation of the machine, and owing to the fact that this adjustment is at the forward or operating end of the machine, he is in a position to set the stopping point with the greatest degree of accuracy and with a facility hitherto unobtainable.

Considerable modification of the mechanism is possible with no departure from the essential features of the invention.

I claim:—

1. The combination with a driven member, of operating mechanism, a clutch adapted to connect said member with the mechanism, a motor adapted to engage and disengage the clutch, means for effecting operation of the motor to engage the clutch, means operatively associated with the driven member for effecting operation of the motor to disengage the clutch, said latter means being adjustable to permit stopping of the driven member at varying points in its travel, and means for adjusting said latter means without interrupting operation of the driven member.

2. The combination with a driven member, of operating mechanism for the member, a clutch adapted to connect said member with the mechanism, an electrically-controlled motor adapted to engage and disengage the clutch, and means controlling the flow of current to said motor comprising a contact element movable with the driven member, a relatively fixed contact element adapted to be engaged by the movable contact element and having an insulated portion, and means electrically connecting said contacts with the motor and with a source of current.

3. The combination with a driven member, of operating mechanism, a clutch adapted to connect said member with the mechanism, an electrically-controlled motor adapted to engage and disengage the clutch, and means controlling the flow of current to said motor comprising a contact element movable with the driven member, a relatively fixed contact element adapted to be engaged by the movable contact element, an insulated element adapted to disengage the contacts and adjustable to different positions in the path of the movable contact, and means electrically connecting said contacts with the motor and with a source of current.

4. The combination with a driven member, of operating mechanism, a clutch adapted to connect said member with the mechanism, an electrically-controlled motor adapted to engage and disengage the clutch, and means controlling the flow of current to said motor comprising a contact element movable with the driven member, a relatively fixed contact element adapted to be engaged by the movable contact element, an insulating element adapted to separate said contact elements and adjustable to different positions in the path of the movable contact, a circuit including said contacts, the motor, and a source of current, and associated means for shifting said insulating element while preventing closing of said circuit.

5. The combination with a driven member, of operating mechanism for the member, a clutch adapted to connect said member with the mechanism, an electrically-controlled motor adapted to engage and disengage the clutch, and means controlling the flow of current to said motor comprising a contact element movable with the driven member, a relatively fixed contact element adapted to be engaged by the movable contact element, an insulating element adapted to separate said contacts and adjustable to different positions in the path of the movable contact, a circuit including said contacts, the motor, and a source of current, and means for shifting said insulating element while maintaining the connection between the said contacts and the motor.

6. The combination with a driven member, of operating mechanism, a clutch adapted to connect said member with the mechanism, an electrically-controlled motor adapted to engage and disengage the clutch, and control means for the motor comprising a contact element carried by the driven member, a relatively fixed contact element disposed in the path of said movable element and adapted to be engaged thereby, an insulated element for insulating the movable contact from the relatively fixed contact at one point of its travel, electrical connectors extending from said contacts to the motor, the connector from the relatively fixed contact comprising separable elements adapted when separated to break the connector, associated means for shifting the insulating element to different positions in the path of the movable contact and for separating said elements to break the said connector, and means carried by the shifting member for maintaining the connector intact following separation of the said elements.

7. The combination with a rotating member, of mechanism for rotating said member, a clutch adapted to connect said member with the mechanism, an electrically-controlled motor adapted to engage and disengage the clutch, and control means for the motor comprising an electrical contact carried by the said rotating member and connected with the motor, an annular contact member also connected with the motor and disposed in the path of said movable contact, said annular contact element being relatively fixed with respect to the other and comprising a segment of insulating material adapted to insulate one contact from the other after each revolution of the shaft.

8. The combination with a rotating member, of mechanism for rotating said member, a clutch adapted to connect said member with the mechanism, an electrically-controlled motor adapted to engage and disengage the clutch, and control means for the motor comprising an electrical contact carried by the shaft and connected with the motor, an annular contact member also connected with the motor and disposed in the path of said movable contact, said annular contact element being relatively fixed with respect to the shaft-carried contact and comprising a segment of insulating material adapted to insulate one contact from the other after each revolution of the shaft, and means for adjusting the insulating segment angularly with respect to the shaft.

9. The combination with a driven member, of operating mechanism, a clutch adapted to connect said member with the mechanism, an electrically-controlled motor adapted to engage and disengage the clutch, a contact element connected with the motor and movable with the driven member, an annular contact element also connected with the motor and disposed in the path of the said movable contact, a connector between the said annular contact element and the motor comprising separable elements adapted when separated to break the motor circuit, an insulated element adapted to separate the contact elements at one point in the travel of said movable contact, and means for adjusting the insulating element to different positions in the path of the movable contact element and adapted in operating position to separate the said separable elements of the connector between the annular contact element and the motor, and means carried by said adjusting means for maintaining the circuit after separation of said elements.

10. In a machine, the combination with a reciprocatory member, of a shaft connected with said member, means for driving the shaft, a clutch adapted to connect the shaft with the driving means, clutch controlling mechanism, and adjustable control means for said mechanism operatively connected with the shaft and located adjacent the said driven member.

11. In a machine, the combination with a reciprocatory member, of a shaft connected with said member, means for driving the shaft, a clutch adapted to connect the shaft with the driving means, clutch controlling mechanism, adjustable control means for said mechanism operatively connected with the shaft and located adjacent the said driven member, and separate control means for said clutch-actuating mechanism also located adjacent said driven member.

EUGENE C. CLARKE.